(12) United States Patent
Crain

(10) Patent No.: US 9,242,697 B2
(45) Date of Patent: Jan. 26, 2016

(54) FOOT PEG FOR STRADDLE-TYPE VEHICLE

(76) Inventor: Thomas M. Crain, Drummonds, TN (US)

( * ) Notice: Subject to any disclaimer, the term of this patent is extended or adjusted under 35 U.S.C. 154(b) by 1068 days.

(21) Appl. No.: 13/380,598

(22) PCT Filed: Jun. 25, 2010

(86) PCT No.: PCT/US2010/039972
§ 371 (c)(1),
(2), (4) Date: Dec. 23, 2011

(87) PCT Pub. No.: WO2010/151753
PCT Pub. Date: Dec. 29, 2010

(65) Prior Publication Data
US 2012/0091687 A1     Apr. 19, 2012

Related U.S. Application Data

(60) Provisional application No. 61/220,632, filed on Jun. 26, 2009.

(51) Int. Cl.
*B62J 25/00* (2006.01)
*B62M 3/08* (2006.01)

(52) U.S. Cl.
CPC .............. *B62M 3/083* (2013.01); *B62J 25/00* (2013.01); *B62M 3/08* (2013.01)

(58) Field of Classification Search
CPC ....................................................... B62J 25/00
USPC .................................. 280/291, 288.4; 74/564
See application file for complete search history.

(56) References Cited

U.S. PATENT DOCUMENTS

| 555,576 A | 3/1896 | Logan |
|---|---|---|
| 639,132 A | 12/1899 | Avery |
| 3,960,027 A | 6/1976 | Magnuson |
| 4,401,315 A | 8/1983 | Pavincic |
| 6,390,488 B1 * | 5/2002 | Wallingsford ................ 280/291 |
| 6,719,316 B1 | 4/2004 | Anthony |
| 6,893,038 B2 * | 5/2005 | Egan ............................ 280/291 |
| D506,707 S | 6/2005 | Egan |
| 7,025,369 B1 | 4/2006 | Sine |
| D560,562 S | 1/2008 | Egan et al. |
| 7,497,291 B1 | 3/2009 | McKim |
| 8,696,009 B1 * | 4/2014 | Heath, Sr. ..................... 280/291 |
| 2005/0241547 A1 | 11/2005 | Colano |
| 2008/0179859 A1 * | 7/2008 | Boehmke et al. ............. 280/291 |
| 2012/0274045 A1 * | 11/2012 | Bruggemann et al. ........ 280/291 |

FOREIGN PATENT DOCUMENTS

| WO | 2007140374 A2 | 12/2007 |
|---|---|---|
| WO | 2011035365 A1 | 3/2011 |

OTHER PUBLICATIONS

Envelope received on May 1, 2012 containing propietery information.*

* cited by examiner

*Primary Examiner* — Kevin Hurley
*Assistant Examiner* — Marlon Arce
(74) *Attorney, Agent, or Firm* — King & Schickli, PLLC

(57) ABSTRACT

An apparatus for supporting an operator's foot riding a straddle-type vehicle. The apparatus includes a foot peg having a first portion connected to the vehicle and arranged for engaging a forward portion of the operator's foot adjacent to or including the ball of the foot. The apparatus also includes a second portion extending rearwardly of the first portion and arranged for engaging a rearward portion of the operator's foot adjacent to or including the heel during flexion of an ankle of the operator.

20 Claims, 8 Drawing Sheets

FOOT PEG FOR STRADDLE-TYPE VEHICLE

This application is the national stage of PCT/US2010/039972, filed Jun. 25, 2010, which claims the benefit of U.S. Provisional Patent Application Ser. No. 61/220,632, filed on Jun. 26, 2009, the disclosures of which are incorporated herein by reference.

FIELD OF THE INVENTION

The present disclosure relates generally to a foot peg for riding and racing straddle-type vehicles, such as motorcross or supercross motorcycles or bicycles, off-road motorcycles or bicycles, all terrain vehicles (ATVs) or the like. In particular, it relates to a foot peg having an extended aft portion to catch and support an operator's foot for providing a certain amount of ankle flexion while preventing extreme ankle flexion in order to reduce the possibility of injury to the operator.

BACKGROUND OF THE INVENTION

Straddle-type vehicles used for racing and riding, such as motorcross, supercross and off-road motorcycles or bicycles, ATVs or the like often include traditional one-dimensional foot pegs for engaging an operator's or rider's feet and boots. Typically, these traditional foot pegs are fixed transversely to the frame of the vehicle and designed to allow the operator to rest the ball of his foot (or front portion of the foot, but not the heel) on the peg and help the operator maintain his or her balance. However, these traditional foot pegs fail to prevent extreme flexion to reduce the possibility of ankle injury to the operator during racing and off-road riding conditions.

In motorcycle racing and off-road riding, the operator is often forced to maneuver the vehicle at high speeds over jumps, berms and around turns over a track that may be composed of dirt, mud, sand and other components. The high speed and jumps lead to very hard and awkward landings due to the magnitude of the force and impact, which can cause injuries to the operator's feet and ankles, such as bruises, sprains and fractures. Moreover, in some instances, the operator may not have his or her feet placed properly on the foot peg causing extreme flexion of the ankle. Therefore, a need exists for a foot peg that prevents extreme flexion to reduce the possibility of ankle injury to the operator. A need also exists for a foot peg that provides additional support to allow superior performance and execution of riding dynamics.

As discussed above, motorcycle racing involves high rates of speed over rough terrain and numerous jumps, so a primary goal of the operator is to maintain his or her balance. Indeed, the operator often finds himself or herself, inadvertently, off balance and falling backward due to the high rates of speed and uneven terrain. As a result, the operator falls backward and his or her hand often twists the throttle applying power to the vehicle and exacerbating the off-balance situation. This sequence of events usually results in the operator becoming separated from the vehicle, which is dangerous for obvious reasons. In addition, the operator's boot may slide off of the foot peg, resulting in even more application to the throttle and, ultimately, resulting in separation of the operator from the motorcycle. Accordingly, a need also exists for an improved foot peg that allows the operator to better regain his or her balance.

Furthermore, racing or riding conditions are often arduous and sometimes include a repeated section of randomly spaced elevated bumps known as "whoops." Under these conditions, operators typically use the technique of extending their arms and getting their buttocks over the back of the vehicles to allow the vehicles to articulate beneath them as they ride and bounce over the whoops at high rates of speed. In doing this, the operator's ankles tend to rotate downward and to the rear where no support is provided by the foot peg. Moreover, an operator's boots often come off of the foot pegs and regain contact with the pegs over and over again during this sequence, making it very difficult to get their boots back into the proper position. Therefore, a need also exists for an improved foot peg that provides additional ankle support at flexion under arduous racing conditions.

Finally, motorcycle racing involves a great deal of contact between an operator's foot and the foot peg. Accordingly, durability of the foot peg is desirable under such conditions to avoid breakage of foot pegs in order to avoid continual foot peg replacement or more-than-routine maintenance, which is expensive and time-consuming. Naturally, any improvements along such lines should further contemplate good engineering practices, such as relative inexpensiveness, stability, flexibility and ease of manufacturing.

SUMMARY OF THE INVENTION

In accordance with one aspect of the disclosure, an apparatus for supporting an operator's foot while riding a straddle-type vehicle is provided. The apparatus includes a foot peg having a first portion connected to the vehicle and arranged for engaging a forward portion of the operator's foot adjacent to or including the ball of the foot. The apparatus also includes a second portion extending rearwardly of the first portion and arranged for engaging a rearward portion of the operator's foot adjacent to or including the heel during flexion of an ankle of the operator.

Preferably, the second portion may be connected to a lower rear edge of the first portion. Further, the second portion may be configured to extend downward from the lower rear edge of the first portion at an angle between five degrees and forty-five degrees. The second portion may be evenly tapered at an angle between five degrees and forty-five degrees or tapered with a camber towards the vehicle to facilitate maintaining the operator's foot on the vehicle. The top surface of the first and second portions may have a plurality of spikes for engaging the operator's foot.

Another related aspect of the disclosure is an improvement in a foot peg for supporting a foot of an operator riding a saddle-type vehicle wherein the foot peg has a first portion connected to the vehicle for engaging a forward portion of the operator's foot. Specifically, the improvement comprises a second portion connected to the first portion for catching a rearward portion of the operator's foot during flexion of the operator's ankle.

Related methods also form part of the disclosure.

BRIEF DESCRIPTION OF THE DRAWINGS

The accompanying drawings incorporated in and forming a part of the specification illustrate several aspects of the present invention and, together with the description, serve to explain the principles of the disclosed embodiments.

In the drawings.

DETAILED DESCRIPTION OF THE PREFERRED EMBODIMENT

In the following detailed description of the preferred embodiment, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process or other changes may be made without departing from the scope of the present invention. The following detailed description is not to be taken in a limiting sense, and the scope of the present invention is defined only by the appended claims and their equivalents. In accordance with the present invention, a foot peg for a straddle-type vehicle is hereinafter described.

Figure 8:
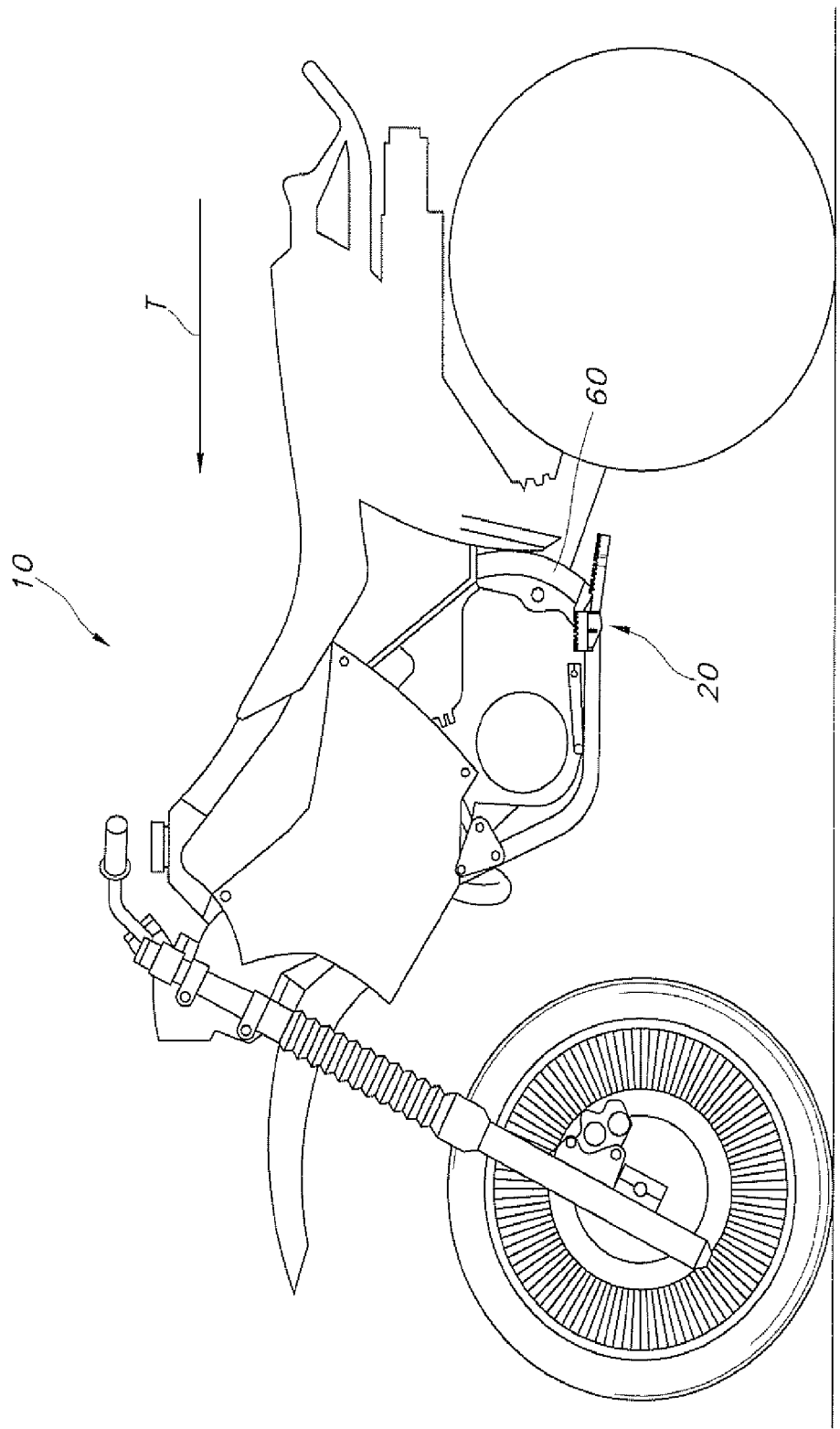
FIG. 8 illustrates an example of a straddle-type vehicle in the form of a motorcycle including the foot peg as shown and described herein.

In one embodiment, a foot support in the nature of a peg is adapted for use on a straddle-type vehicle 10, such as a motocross motorcycle (as shown in FIG. 8). It should be appreciated that other types of straddle-type racing and riding vehicles such as full size motorcycles, minibikes, three wheelers, ATVs, snowmobiles, motocross bicycles (BMX), vertical trick bicycles (such as bicycles having trick pegs on the bike axles or elsewhere) or mopeds may also implement the foot peg described herein.

Figure 1:
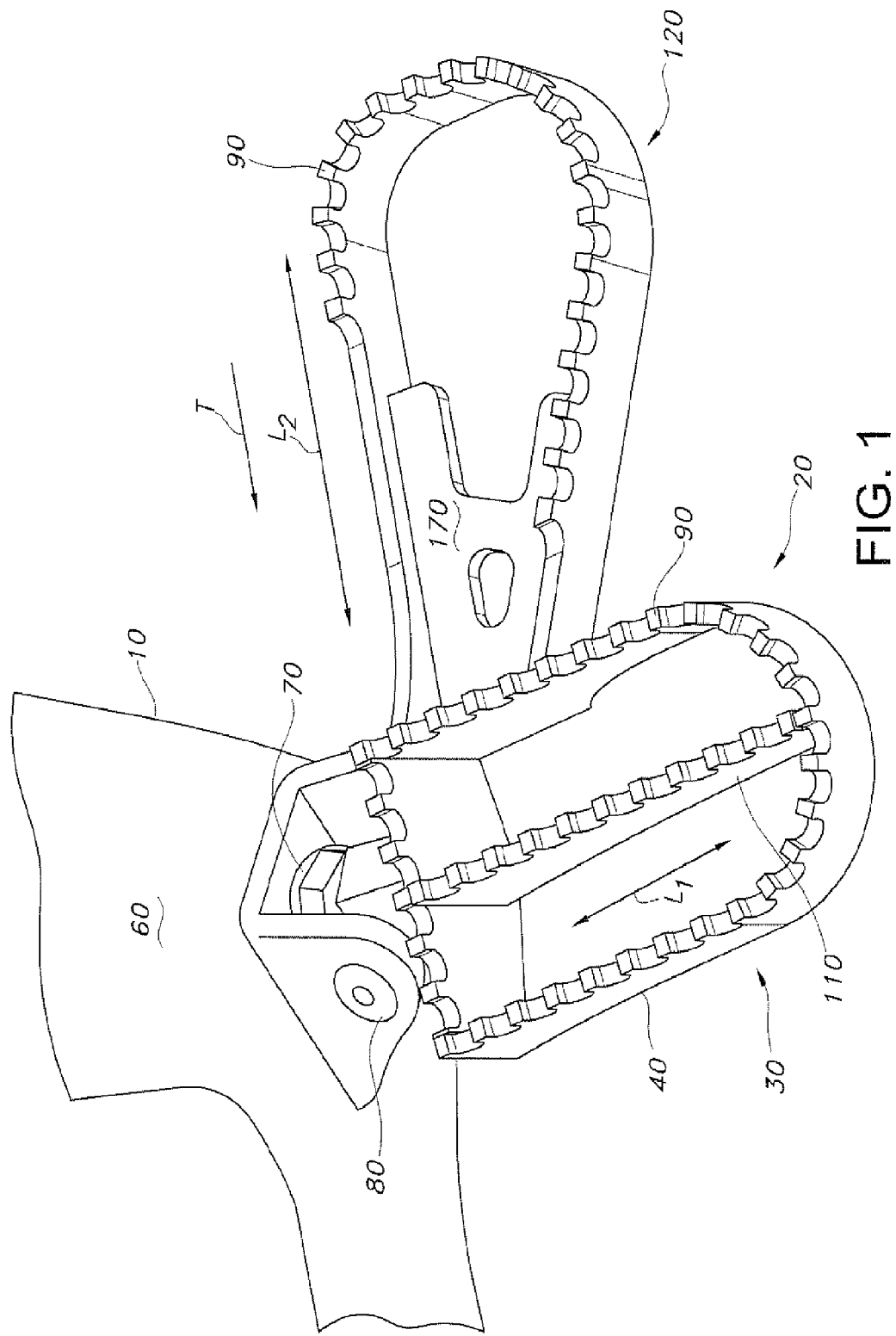
FIG. 1 is a perspective view of a representative foot peg forming one aspect of the disclosure.
Figure 2:
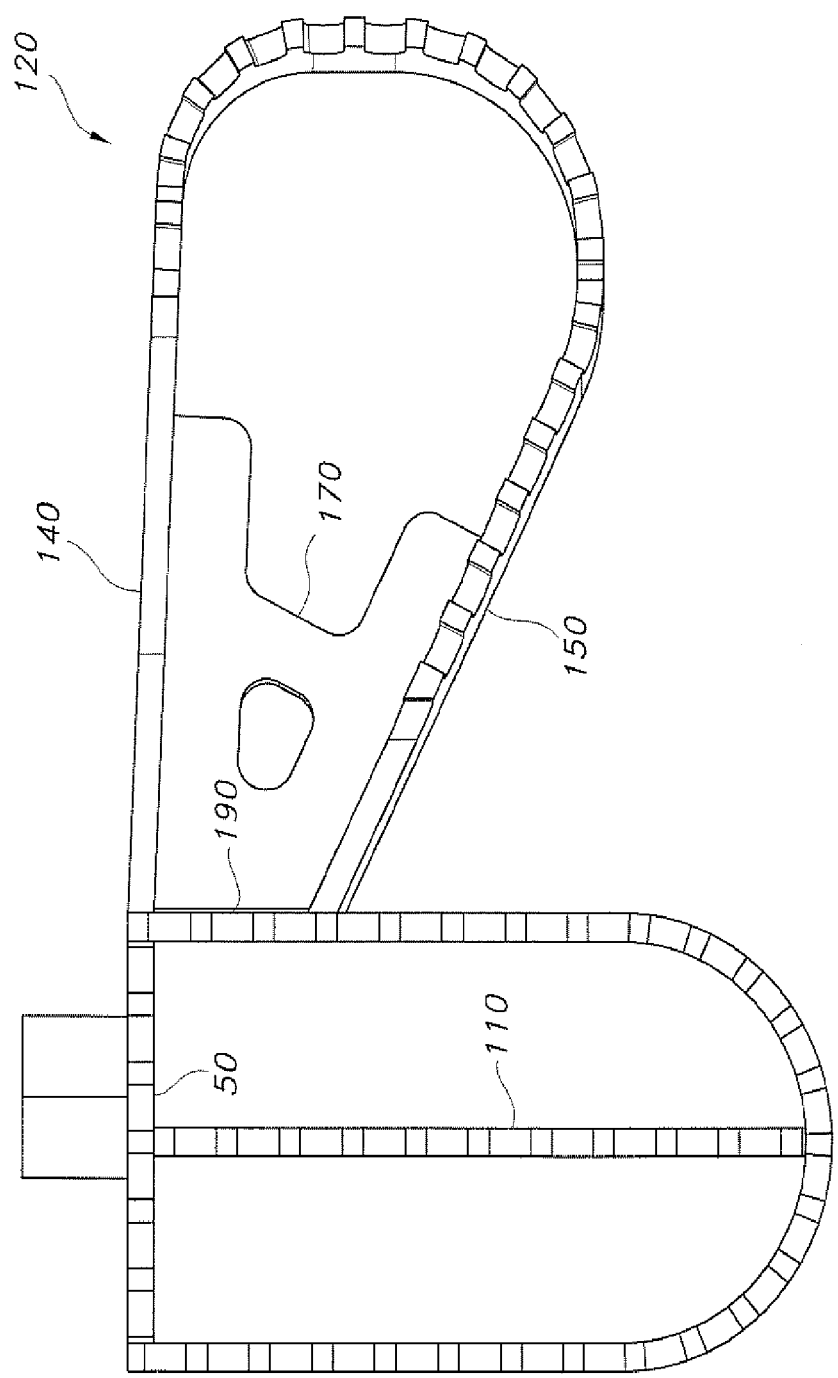
FIG. 2 is a top view of a representative foot peg forming one aspect of the disclosure.

With reference to FIGS. 1-7, the vehicle 10 includes a foot peg 20 on one side. Of course, it should be appreciated that the vehicle 10 may have an identical foot peg 20 on each side to accommodate both of the operator's feet, but only one foot peg is described herein. Turning to FIGS. 1 and 2, the foot peg 20 in the illustrated preferred embodiment includes a first or main portion 30 having a direction of elongation $L_1$ extending substantially perpendicular to a direction of travel T of the vehicle 10. The main portion 30 of the foot peg 20 is adapted to engage and provide support for the ball of the operator's foot when the operator is positioned on the vehicle 10. In the illustrated embodiments, this main portion 30 includes a rigid body 40 forming a U-shape with an end piece 50. The exterior of the end piece 50 may connect to a frame 60 of the vehicle 10, such as at a proximal end of the main portion 30 opposite of the rounded distal end of the "U." As shown in FIG. 1, the main portion 30 may have a center piece 110 extending through the center of the body 40 to provide addition support for the operator's foot.

In more detail, the main portion 30 may be rigidly or pivotally connected to the motorcycle 10 at one or more attachment points 70 on the frame 60 of the motorcycle. Specifically, the main portion 30 of the foot peg 20 may be connected to the frame 60 of the vehicle 10 in the same manner as traditional foot pegs. Methods of attachment include, but are not limited to, bolting, screw-fitting, welding and the like. As a result, manufacturers can assemble the foot pegs without any adjustment to the manufacturing process, thereby saving manufacturing costs. For example, the main portion 30 may be secured to the frame 60 through a flange (not shown) connected to the end piece 50 and a bolt or pin 80 positioned through a channel within the proximal end of the main portion 30. Alternately, the foot peg 20 be used under after-market conditions as retrofits to existing vehicles.

The main portion 30 may also include a friction enhancing mechanism such as a plurality of spikes or teeth 90 extending along a top surface 100 of the main portion 30 to improve engagement of the foot peg 20 with the operator's foot. In more detail, the plurality of spikes 90 may contact the undersurface of a operator's boot to help keep it in the proper position. The plurality of spikes 90 have a height sufficient to operate in typically muddy environments. The spacing between the plurality of spikes 90 is sufficient to retain contact with an operator's boot even if mud accumulates between the plurality of spikes 90. The number of spikes 90 may vary but is typically at least twenty. Spikes 90 may also be provided on the center piece 110 for better engagement with the operator's foot. It should be appreciated that the main portion 30 may have a solid platform (with or without a plurality of spikes) covering the top surface 100 and may also include other support structures to provide additional strength.

The foot peg 20 also includes a second or sub and aft portion 120, which is positioned slightly below and behind the main portion 30. During use, the sub and aft portion 120 functions when the operator's ankle is flexed to approximately forty-five degrees downward from a plane of the main portion 30 and a portion of the operator's foot adjacent to or including the heel engages it. In more detail, when an operator makes a hard and/or awkward landing following a jump, the sub and aft portion 120 acts as a catch for catching the heel of the operator's foot (which normally includes a shoe or boot) as the heel rotates downward from the level plane of the main portion 30 horizontal with the sole of the boot under normal riding conditions. The sub and aft portion 120 supports the boot or foot in such a manner to prevent extreme flexion of the operator's ankles, but does not otherwise impede normal ankle movement under riding conditions where some ankle flexion is desirable. Previously, the operator's boot would have slipped off of the main portion 30 of the peg 20 resulting in involuntary application to the throttle and separation of the operator and motorcycle or injury to the ankle caused by extreme flexion of the ankle.

Figure 3:
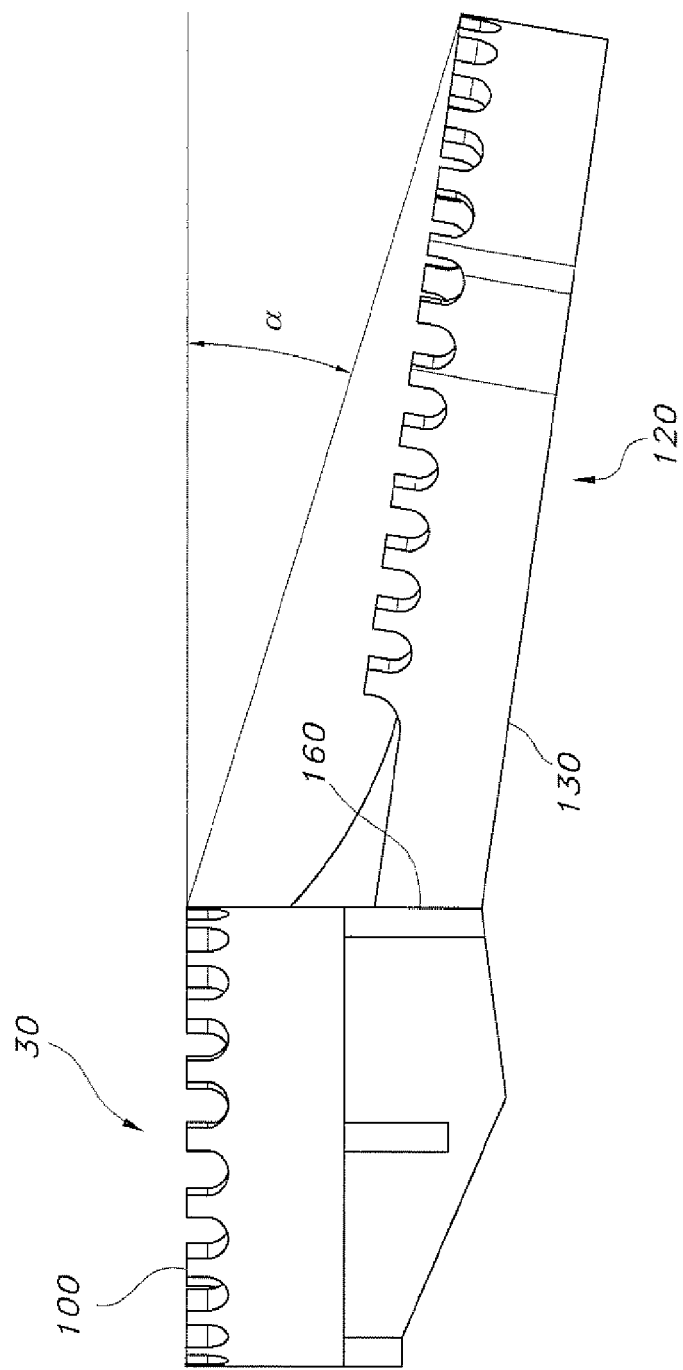
FIG. 3 is a side view of a representative foot peg forming one aspect of the disclosure.

With reference to FIGS. 2 and 3, the sub and aft portion 120 includes a rigid frame 130 having a direction of elongation $L_2$ generally aligned with and parallel to the direction of travel T, and generally perpendicular to the direction of elongation $L_1$. A plurality of spikes 90 may be positioned along a top surface 200 of the frame 130. The plurality of spikes 90 may be positioned in various patterns, such as extending substantially along the entire top surface 200 or equally spaced at various distances along the top surface. The frame 130 includes opposing ends 140, 150 extending away from a lower, rear edge 160 of the main portion 30 and connecting together. Consequently, the frame 130 is shaped similar to a horseshoe, or substantially U-shaped. The sub and aft portion 120 is connected to the main portion 30 at the lower, rear edge 160 of the main portion via the opposing ends 140, 150. Methods of connection include a fixed or rigid connection such as welding and integral formation or a releaseable connection, including the use of fasteners, such as bolts or hooks.

Figure 4:
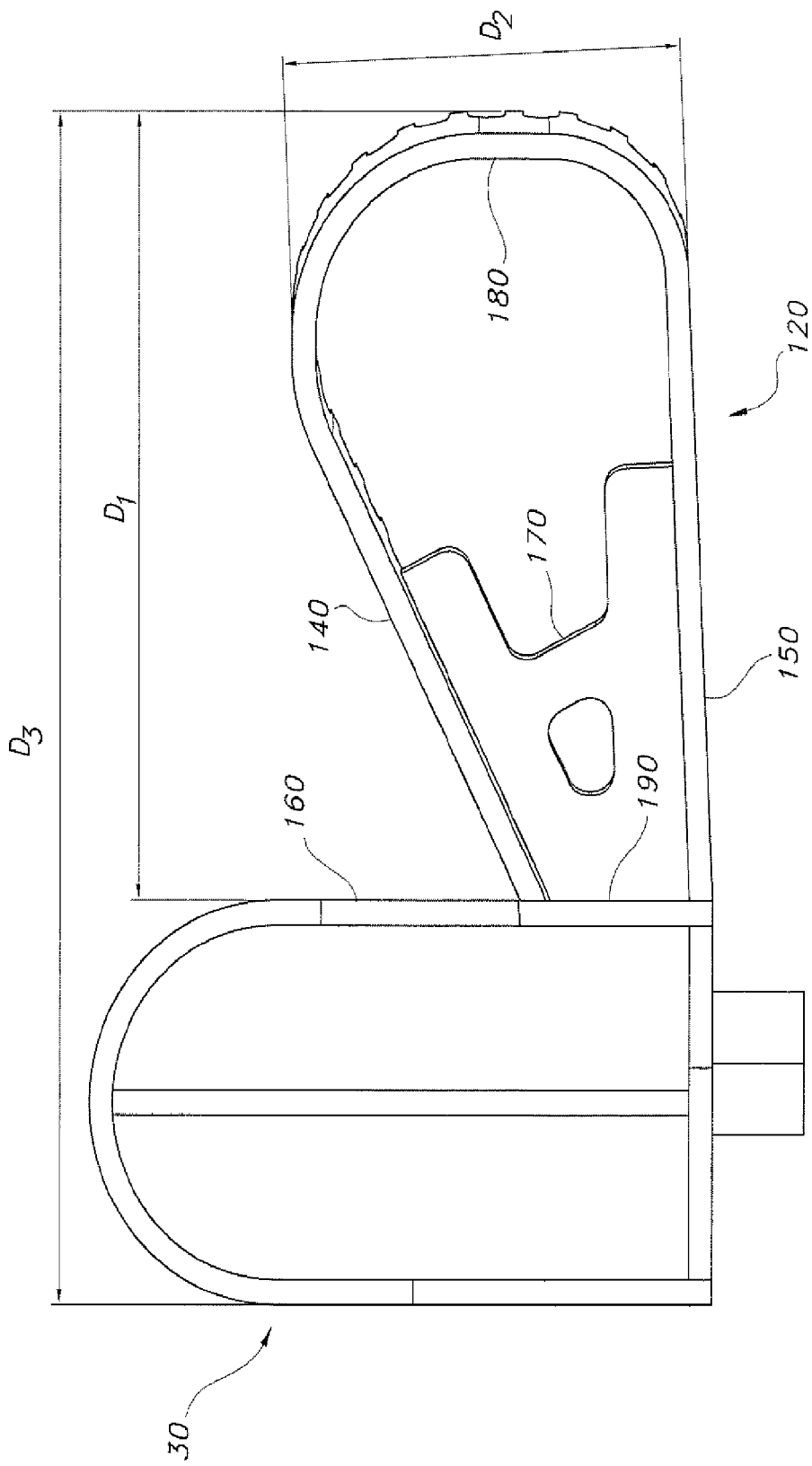
FIG. 4 is a bottom view of a representative foot peg forming one aspect of the disclosure.

As perhaps best shown in FIGS. 2 and 4, the sub and aft portion 120 includes an inner support 170. The inner support 170 is positioned in between the opposed ends 140, 150 at a first end 190 (opposite the rounded rear end 180) of the frame 130. The inner support 170 is shaped like an "A" to provide additional support. In other embodiments, the sub and aft portion 120 may include at least one support panel (not shown). The support panel may take the form of a flat panel attached to the rear edge 160 of the main portion 30 and attached to the front end 190 of the sub and aft portion 120. In yet another embodiment, the sub and aft portion 120 may include a support bar (not shown) extending down the center of the frame 130 to provide additional support for the heel of an operator's boot.

Figure 5:
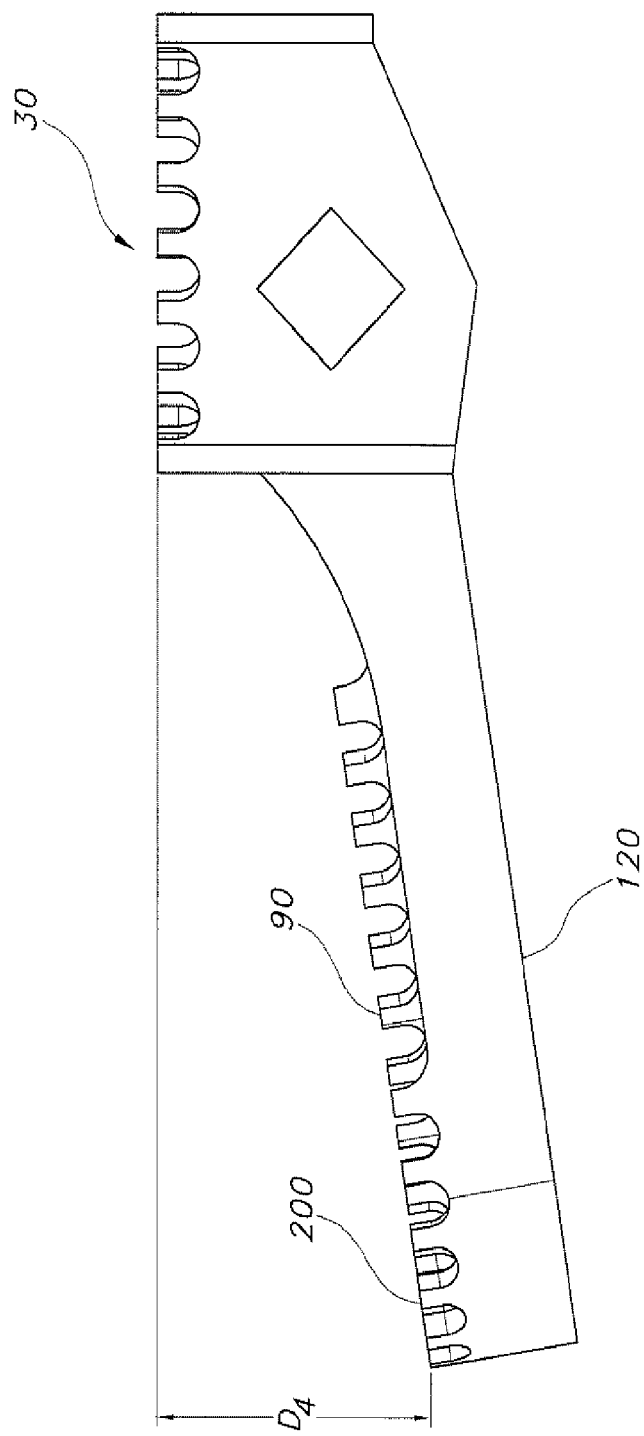
FIG. 5 is a second side view of a representative foot peg forming one aspect of the disclosure.
Figure 6:
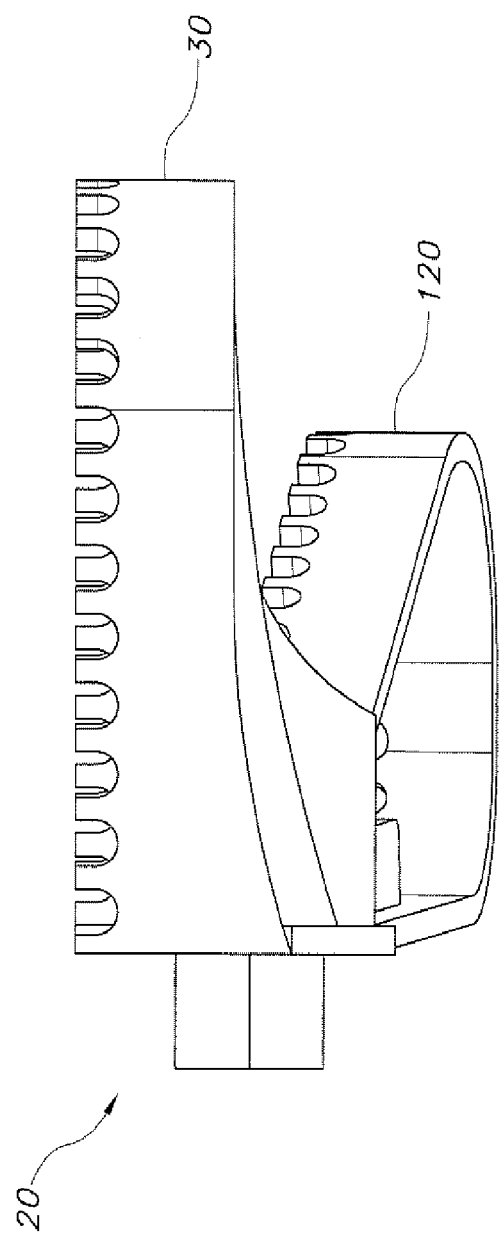
FIG. 6 is a front view of a representative foot peg forming one aspect of the disclosure.
Figure 7:
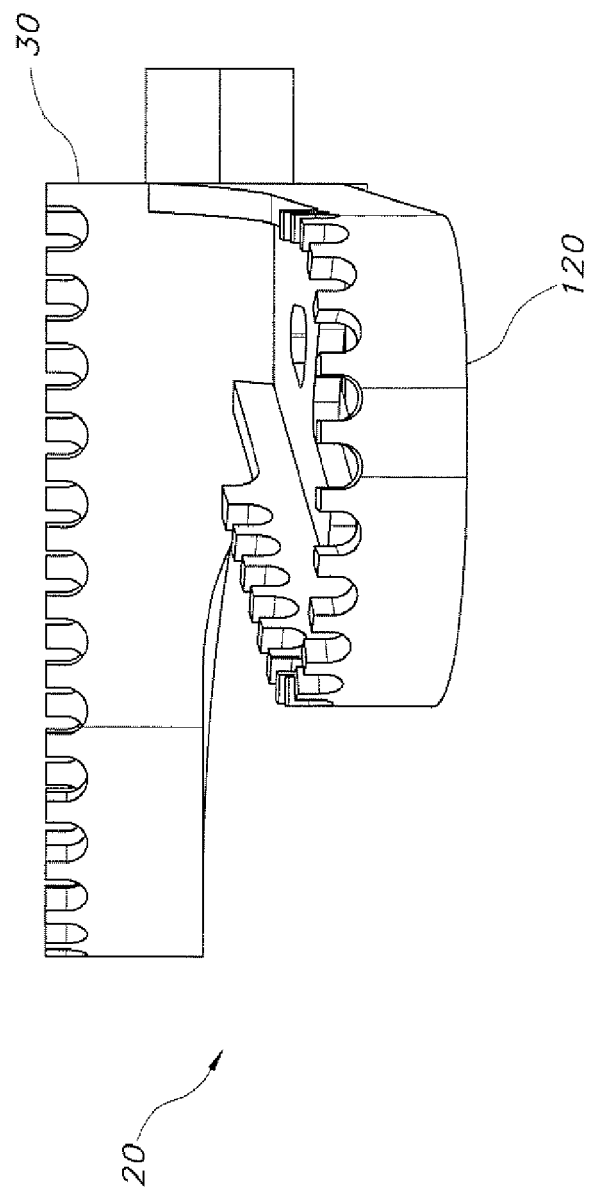
FIG. 7 is a rear view of a representative foot peg forming one aspect of the disclosure.

Turning to FIGS. 3 and 5, the sub and aft portion 120 may curve or slope down from the rear edge of the main portion 30. As a result, the sub and aft portion 120 allows an operator to better regain his or her balance. For example, the operator may inadvertently become off balance and fall backward from the motorcycle. In some instances, an operator's ankle rotates backward, as before, or an entirety of the operator's boot slides off of the main portion 30 of the foot peg 20. If so, the sub and aft portion 120 acts as a platform for the operator's boot and assists the operator in regaining balance. As discussed above, the sub and aft portion 120 may include a plurality of spikes 90 to provide a suitable surface for gripping the bottom of the operator's boot which assists in gaining traction and stability.

With reference to FIG. 4, a distance $D_1$ exists between the rear edge 160 of the main portion 30 and the rear end 180 of the sub and aft portion 120. A distance $D_2$ exists between the two opposed ends 140, 150 of the sub and aft portion 120. The distance $D_2$ may vary from the first end 190 to the rear end 180 as the opposed ends extend slightly outward as they extend away from the front end and connect at the rounded rear end. Further, the distances $D_1$ and $D_2$ vary in different embodiments to accommodate a variety of sizes of riding vehicles and a variety of sizes of riders' feet. Preferably, the distance $D_1$ is an amount that substantially corresponds to the distance between the ball and heel of the operator's foot, and may be between two (2) inches and eight (8) inches. Preferably, the distance $D_2$ is between two (2) inches and four (4) inches. The overall distance $D_3$ from a frontmost end of the main portion 30 to the rear end 180 will typically comprise a major portion of the length of the operator's foot (e.g., for a 12 inch foot, a distance $D_3$ greater than six inches).

Turning to FIG. 5, another distance $D_4$ exists between a top of the main portion 30 and a top of the sub and aft portion 120 of about 0.2 to 3 inches (although other distances are possible), to remain spaced from the operator's boot heel during normal riding conditions, but to catch the heel during extreme situations. In addition (as shown in FIG. 3), the sub and aft portion 120 extends downwardly at an angle $\alpha$ with reference to the main portion 30. Although the angle $\alpha$ may vary in different embodiments, it is preferably between five degrees and forty five degrees. In one embodiment, it may be evenly tapered at an angle of approximately 19° or 20°. However, a steeper angle may be desirable for a more aggressive design or a shallower angle may be desirable for greater support. Alternatively, the sub and aft portion 120 may be tapered with a slight camber leaning to the inside (i.e., towards the vehicle 10). This slight camber towards the motorcycle facilitates keeping the operator's foot on the foot peg in the event of a hard landing versus allowing the foot to slip off towards the outside of the foot peg 20.

It should be appreciated that the foot peg 20 is specifically positioned to avoid interference with other parts of the riding vehicle, such as a kick stand or kick start (not shown). Alternately, the positioning of at least one portion of the foot peg 20 is made adjustable to avoid interference with other parts of the riding vehicle, such as the kick stand or kick start.

As shown in the embodiment illustrated in FIGS. 1-7, the sub and aft portion 120 has a direct arrangement with the main portion 30 (i.e., it contacts with the main portion without any intervening support structures). In other embodiments, the sub and aft portion 120 and the main portion 40 may be one continuous piece. Methods of manufacturing the entire foot peg 20 as one continuous piece include, but are not limited to, casting and forging. Alternatively, the sub and aft portion 120 may be independently attached to the riding vehicle 10 at one or more attachment points. Methods of attachment include, but are not limited to, bolting, screw-fitting and welding. Finally, the sub and aft portion 120 may be designed to be retrofitted to attach to an existing main portion. Methods of attachment include, but are not limited to, bolting, clipping, and welding.

As should now be appreciated, the sub and aft portion 120 assists an operator during arduous racing or riding conditions, such as riding over whoops. The sub and aft portion 130 provides support to the heel if the ankles rotate downward. In addition, under these conditions, the boots often come off of the pegs altogether and regaining contact with the pegs, in a proper position, can be difficult in some circumstances. Therefore, the sub and aft portion 120 also provides a larger platform at a proper angle to allow better control of the motorcycle as compared to the prior art.

The composition material of the foot peg 20 includes, but is not limited to, metal, steel, aluminum, titanium, blends of metal, fiberglass, and rigid polymers or the like. The foot peg 20 may include a gauge and thickness, which varies depending on the composition material. Preferably, the thickness is between one eighth (⅛) of an inch and one (1) inch. Methods of manufacturing the foot peg 20 also vary depending on the composition material. If the composition material is metal, steel, aluminum, titanium, a metal blend or a similar material, portions of the foot peg 20 may welded, bolted, forged or casted together. If the composition material is fiberglass, a rigid polymer or a similar material, the foot peg 20 may be formed integrally.

Additional embodiments are also possible without departing from the teachings of the present invention. This detailed description, and particularly the specific details of the exemplary embodiments disclosed herein, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. An apparatus for supporting an operator's foot riding a straddle-type vehicle, comprising:
   a foot peg including a first portion having a front wall, two side walls connected by a rounded rear wall and a center piece extending from the front wall to the rear wall, said first portion connected to the vehicle and arranged for engaging a forward portion of the operator's foot adjacent to or including the ball of the foot, and a second portion extending rearwardly of the first portion and arranged for engaging a rearward portion of the operator's foot adjacent to or including the heel during flexion of an ankle of the operator, wherein the first portion has a plurality of spikes extending along an entirety of a top surface of the front wall, the two side walls, the rear wall and the center piece of the first portion and wherein the second portion has a plurality of second spikes extending along a top surface of said second portion.

2. The apparatus according to claim 1, wherein the second portion connects to a lower rear edge of the first portion.

3. The apparatus according to claim 2, wherein the second portion extends downward from the lower rear edge of the first portion at an angle between five degrees and forty-five degrees.

4. The apparatus according to claim 3, wherein the second portion is evenly tapered at an angle between five degrees and forty-five degrees.

5. The apparatus according to claim 3, wherein the second portion is tapered with a camber towards the vehicle.

6. The apparatus according claim 1, wherein the second portion is substantially U-shaped.

7. The apparatus according to claim 1, wherein the second portion is rigidly connected to the first portion such that a non-pivotal connection is formed.

8. The apparatus according to claim 7, wherein the rigid connection is a weld or cast.

9. The apparatus according to claim 1, wherein a distance from a rear edge of the first portion and a rear edge of the second portion is between about 2 inches and about 8 inches.

10. The apparatus according to claim 1, wherein a distance from a top surface of the first portion and a top surface of the second portion is between about 0.2 inches and about 3 inches.

11. The apparatus according to claim 1, wherein the first portion includes a first direction of elongation generally perpendicular to a direction of travel of the vehicle and the second portion includes a second direction of elongation generally perpendicular to the first direction of elongation of the first portion.

12. A foot peg for preventing extreme flexion of an ankle of an operator of a straddle-type vehicle, comprising:
   a main portion transversely connected to the vehicle configured to support a ball of a foot of the operator; and
   a sub portion fixedly connected to a rear edge of the main portion via a non-pivotable cast for catching a heel of the foot of the operator to prevent extreme flexion of the ankle, wherein the sub portion projects downwardly from the main portion at an angle of between about fifteen degrees and about forty-five degrees.

13. The foot peg of claim 12, wherein an upper surface of the sub portion includes a plurality of spikes.

14. The foot peg of claim 12, wherein the sub portion has a first dimension extending in a direction parallel to a direction of travel of the vehicle.

15. The foot peg of claim 14, wherein the first dimension is at least as great as a majority of the length of the operator's foot in the travel direction.

16. The foot peg of claim 12, wherein the main portion includes a rigid body forming a U-shape with an end piece directly connected to the vehicle.

17. The foot peg of claim 16, wherein the rigid body of the main portion includes a front wall, a pair of side walls forming the U-shape and a center piece extending through the center of the body from the front wall to a rear edge of the main portion.

18. The foot peg of claim 17, wherein a plurality of spikes extend vertically along an entirety of a top surface of the front wall, the pair of side walls and the center piece of the main portion.

19. In a foot peg for supporting a foot of an operator riding a saddle-type vehicle, said foot peg having a first portion connected to the vehicle for engaging a forward portion of the operator's foot, the improvement comprising a second portion non-pivotally casted to the first portion for catching a rearward portion of the operator's foot during flexion of an ankle of the operator, wherein the second portion extends downward from the lower rear edge of the first portion at a constant angle, wherein the second portion includes a substantially U-shaped frame having a plurality of friction enhancing elements for engaging the operator's foot.

20. The improvement of claim 19, wherein the constant angle is between five degrees and forty-five degrees.

\* \* \* \* \*